(12) United States Patent
Hammer

(10) Patent No.: US 9,180,561 B2
(45) Date of Patent: Nov. 10, 2015

(54) MOBILE RESERVOIR SYSTEM AND METHOD FOR REUSING UNUSED CLEAN WATER

(71) Applicant: Scott David Hammer, Dallas, TX (US)

(72) Inventor: Scott David Hammer, Dallas, TX (US)

( * ) Notice: Subject to any disclaimer, the term of this patent is extended or adjusted under 35 U.S.C. 154(b) by 122 days.

(21) Appl. No.: 13/896,136

(22) Filed: May 16, 2013

(65) Prior Publication Data

US 2014/0339803 A1 Nov. 20, 2014

(51) Int. Cl.
*E03B 1/00* (2006.01)
*B23P 19/00* (2006.01)
*E03B 1/04* (2006.01)

(52) U.S. Cl.
CPC ............... *B23P 19/00* (2013.01); *E03B 1/041* (2013.01); *E03B 1/048* (2013.01); *E03B 2001/045* (2013.01); *E03B 2001/047* (2013.01); *Y10T 29/49826* (2015.01)

(58) Field of Classification Search
CPC ............. B60P 3/02; B62B 3/10; B62B 1/264
USPC ............... 280/47.26, 79.5, 47.34, 47.35, 830, 280/831, 836, 839, 79.11, 79.2; 220/1.5, 220/131, 41.14, 571; 141/99, 231; 222/131; D34/19, 20
See application file for complete search history.

(56) References Cited

U.S. PATENT DOCUMENTS

| | | | | | |
|---|---|---|---|---|---|
| 453,358 | A | * | 6/1891 | Maxon | 280/830 |
| 640,118 | A | * | 12/1899 | Eck | 239/172 |
| 3,263,865 | A | * | 8/1966 | Kachnik | 222/159 |
| 4,274,645 | A | * | 6/1981 | Ferguson et al. | 280/47.26 |
| 4,775,067 | A | * | 10/1988 | Mount | 220/573 |
| 5,480,191 | A | * | 1/1996 | Litin et al. | 280/831 |
| 5,813,680 | A | * | 9/1998 | Shaw et al. | 280/47.26 |
| 6,367,586 | B1 | * | 4/2002 | Tally | 184/1.5 |
| D605,375 | S | * | 12/2009 | Anderson et al. | D34/39 |
| 8,205,492 | B2 | * | 6/2012 | Martheenal | 73/170.17 |

* cited by examiner

*Primary Examiner* — Anne Marie Boehler
(74) *Attorney, Agent, or Firm* — D. Scott Hemingway; Hemingway & Hansen, LLP

(57) ABSTRACT

The present invention supports a reservoir system and method that allows a household or user to collect, retain and reuse unused clean water (i.e. clean water left in buckets, glasses, cups, etc.) instead of dumping it down a drain. Rain water may also be collected, retained and used. The reservoir system includes a reservoir tank for storing the water, dump bucket to receive the water, a piping and water releasing mechanism to release the water being stored and a mobility mechanism to allow for transportability of the system. The reservoir system is designed to help combat the current green initiative to save water for more practical uses.

24 Claims, 3 Drawing Sheets

MOBILE RESERVOIR SYSTEM AND METHOD FOR REUSING UNUSED CLEAN WATER

RELATED APPLICATION DATA

Not Applicable.

TECHNICAL FIELD

The present invention relates in general to a system and method for collecting and reusing unused clean water.

BACKGROUND OF THE INVENTION

Precipitation collectors are becoming more widespread as water conservation awareness increases. Precipitation collectors provide a means of collecting precipitation and storing that precipitation for use at a later time.

SUMMARY OF THE INVENTION

The present invention supports a reservoir system and method that allows a household or user to collect, retain and reuse unused clean water (i.e. clean water left in buckets, glasses, cups, etc.) instead of dumping it down a drain. Rain water may also be collected, retained and used. The reservoir system includes a reservoir tank for storing the water, dump bucket to receive the water, a piping and water releasing mechanism to release the water being stored and a mobility mechanism to allow for transportability of the system. The reservoir system is designed to help combat the current green initiative to save water for more practical uses.

DETAILED DESCRIPTION

The reservoir system described herein is designed to provide a user with an established place to collect, retain and reuse unused clean water (i.e. clean water left in buckets, glasses, cups, etc.) instead of being dumped down a drain. Rain water may also be collected, retained and used. The system is designed to help combat the current green initiative to save water for more practical uses.

The reservoir system comprises a reservoir tank, a dump bucket, a release valve, a tank pipe, a handle and wheels.

Figure 1:
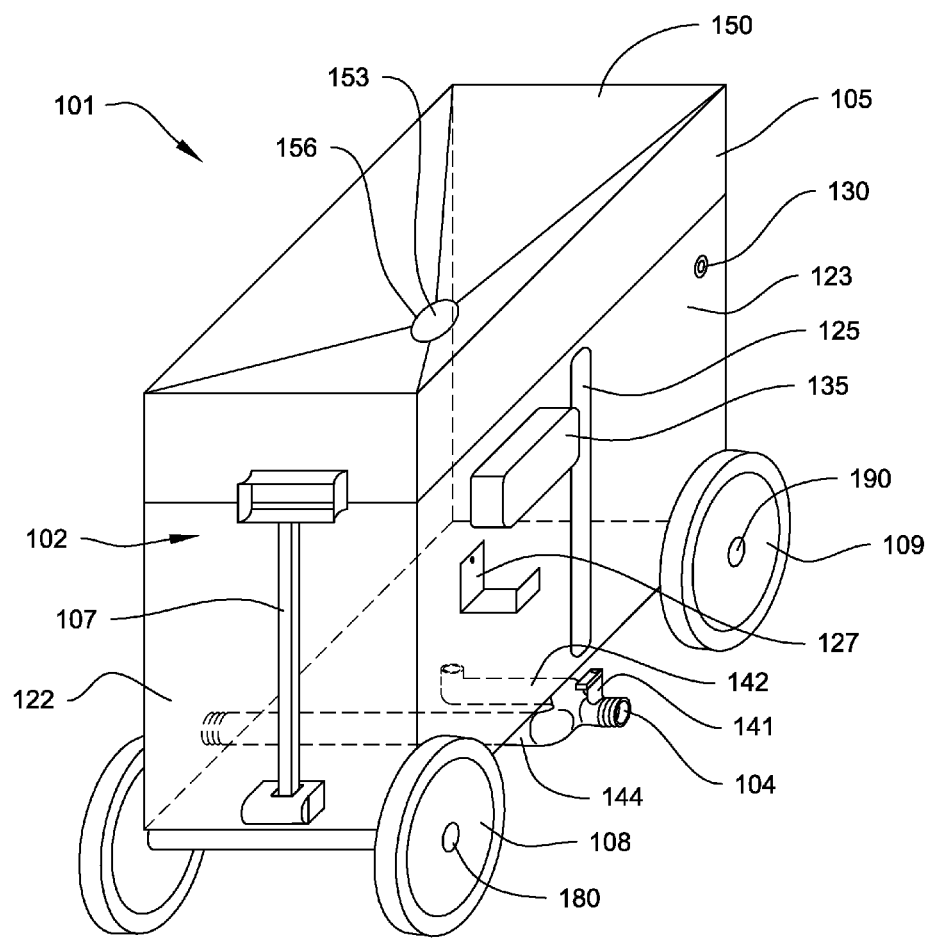
FIG. 1 is a side perspective view illustrating an embodiment of a reservoir system for reusing unused water.

FIG. 1 illustrates a side perspective view of an embodiment of a reservoir system (101) for unused water. A reservoir body or tank (102), having a top side (120), a bottom side (121), lateral vertical sides (122) and longitudinal vertical sides (123), has a volumetric capacity to store the unused water. The reservoir tank (102) comprises a dump bucket (105), having a top surface (150) and a bottom surface (151), where the bottom surface (151) is secured to the top side (120) of the reservoir tank (102). Dump bucket (105) defines a bucket opening (156) that extends from top surface (150) to bottom surface (151).

Although reservoir tank (102) is illustrated as a box-like shape, other shapes such as cylinders or spheres may also be used and maintain the scope of the invention.

The top surface (150) of the dump bucket (105) is a water receiving area and preferably tapers downward from an outer edge of the top surface (150) towards the bucket opening (156) to funnel the water towards the bucket opening (156) and into the reservoir tank (102). The taper of top surface (150) may be pyramidal, conical, or any other shape that allows the liquid to funnel toward the bucket opening (156). The dump bucket (105) preferably has a similar perimeter to reservoir tank (102) as it allows for easier assembly and provides a wide water receiving area.

A pour valve (153) is secured to the underside of the bottom surface (151) that at least encompasses the entire bucket opening (156). Pour valve (153) is designed to open upon the weight of the water. The pour valve (153) is advantageous in helping to deny any unwanted debris or bugs from entering the reservoir tank (102). Pour valve (153) also keeps the water from escaping the reservoir tank (102) by way of splashing during transport, evaporation, or animals drinking the water. Dump bucket (105) and top side (120) of reservoir tank (102) may be removable to allow for cleaning of the reservoir tank (102).

The piping and water releasing mechanism of the reservoir system (101) comprises a release valve (104), a tank pipe (142), a spout pipe (144) and a switch (141). The release valve (104) is secured to the bottom side (121) of the reservoir tank (102). The tank pipe (142) is also secured to the bottom side (121) of the reservoir tank (102) and has one end attached to the release valve (104) and another end extending into the bottom side (121) of the reservoir tank (102). When the release valve is opened, water collected in reservoir tank (102) leaves the reservoir tank (102) via tank pipe (142) and then out through the release valve (142). By securing tank pipe (142) to the bottom side (121) of the reservoir tank (102), the reservoir system (101) utilizes gravity to pull the water out of the reservoir tank (102) and then through the tank pipe (142) to the release valve (104).

The spout pipe (144) may also be secured to the bottom side (121) of the reservoir tank (102). One end of spout pipe (144) is attached to the release valve (104) with the other end adapted to attach to a hose. The hose would be attached to a spout or spigot. Release valve (104) comprises the switch (141) that allows the user to toggle between using the water from the reservoir tank (102) and a spout. This is advantageous as the reservoir tank (102) may not contain enough water to perform the user's desired task.

Preferably reservoir tank (102) is a sealed tank that is air and water tight when all valves are closed. To assist the release of the stored liquid within the reservoir tank (102), the reservoir tank may be pressurized. This can be done with an air pump (represented by 135) integral to the reservoir system (101) or the reservoir system (101) can be adapted with an air intake/exhaust valve (represented by 130) to engage an external air pump. The pressurized tank (102) now provides the pressure and force to push the liquid out through the release valve when the release valve (104) is opened. When tank is pressurized, pour valve (153) is sealed tight against bucket opening (156) until the pressure is relieved.

Another example may have a reservoir with two chambers. The first chamber being a basic chamber wherein a liquid may be dumped or stored. The second chamber would act as a typical water pressure tank. Pressure tanks store pressurized water. The pressure tanks generally operate by using drops in pressure below a certain point to activate the pumps which replenish the water and raise the pressure. Most water systems are set up so the pump turns on at 20, 30 or 40 psi and turns off at 40, 50 or 60 psi, respectively.

The reservoir system (101) would have a motor or pump that when activated, pumps the liquid from the first chamber into the second chamber. The liquid would remain under pressure within the second chamber until the user opens the release valve (104), through which the pressurized liquid leaves the reservoir system (101). Preferably, the pump is user activated so that the pump is not activated with an empty first chamber as that may cause damage to pump and/or system.

If a pressurized reservoir tank is not desired by the user, the water may still be released from the reservoir tank (102) through the release valve (104) naturally by gravitational forces.

The reservoir system (101) further comprises a mobility mechanism, which includes front wheels (108), rear wheels (109), a front axle (180) and a rear axle (190), to provide mobility to the reservoir system (101). Front wheels (108) and rear wheels (109) are preferably secured to front axle (180) and rear axle (190), respectively, and front axle (180) and rear axle (190) secured to the bottom side (121) of reservoir tank (102). Front wheels (108) and rear wheels (109) may also be directly secured to the reservoir tank (102) by pegs, knobs or the like that extend out from the reservoir tank (102). Alternatively, the front axle (180) and/or rear axle (190) may be adapted to pivot to allow for improved steering of the reservoir system (101) while in transport.

A handle (107) may also be secured to the reservoir tank (102) to allow a user an easier way to pull the reservoir system (101) in transport to the desired location. Alternatively, handle (107) may be connected to the front axle (180) with pivoting capabilities to assist in pivoting the front axle (180) and steering the reservoir system (101) while in transit.

Preferably release valve (104) is located along the bottom of a longitudinal vertical side (123) with tank pipe (142) and spout pipe (144) extending laterally along the bottom side (121) of the reservoir tank (102). This arrangement keeps the release valve (104), tank pipe (142) and spout pipe (144) from interfering with the front axle (180) and rear axle (190). Release valve (104) may be located along a lateral vertical side (122) with tank pipe (142) and spout pipe (144) extending longitudinally along the bottom side (121) of the reservoir tank (102) if arranged to not interfere with the front axle (180) and/or rear axle (190).

Reservoir tank (102) may also have a water level indicator (125). Preferably, the water level indicator (125) is a clear portion of reservoir tank (102) where a user can clearly and easily see the water level. Other liquid level indicators like gauges, dials and the like may also be used.

Additionally, a hose hook (127) may be secured to the vertical wall (122) of the reservoir tank (102) to provide a convenient storage place for a hose apparatus.

Another advantage of the reservoir system described herein allows a user to have a large portable watering tank. A user may transport the reservoir system (101) to the desired watering location. This allows the user to have a large watering supply in any location. This alleviates multiple trips to refill a typical watering can or even having to carry a heavy watering can. It also provides a user who typically uses a watering hose to extend beyond their watering area because the user is not limited by the length of the watering hose.

All parts of the reservoir system may be made of plastic, metal or composite material or combination thereof. The material must strong enough to withstand any water pressure or water weight caused from the tank water or spout water. If metal is used, preferably a metal with rust resistance to withstand various weather climates. Any plastic or composite materials should have a crack resistance for a wide range of temperatures so as not to crack under typical climate conditions.

Figure 2:
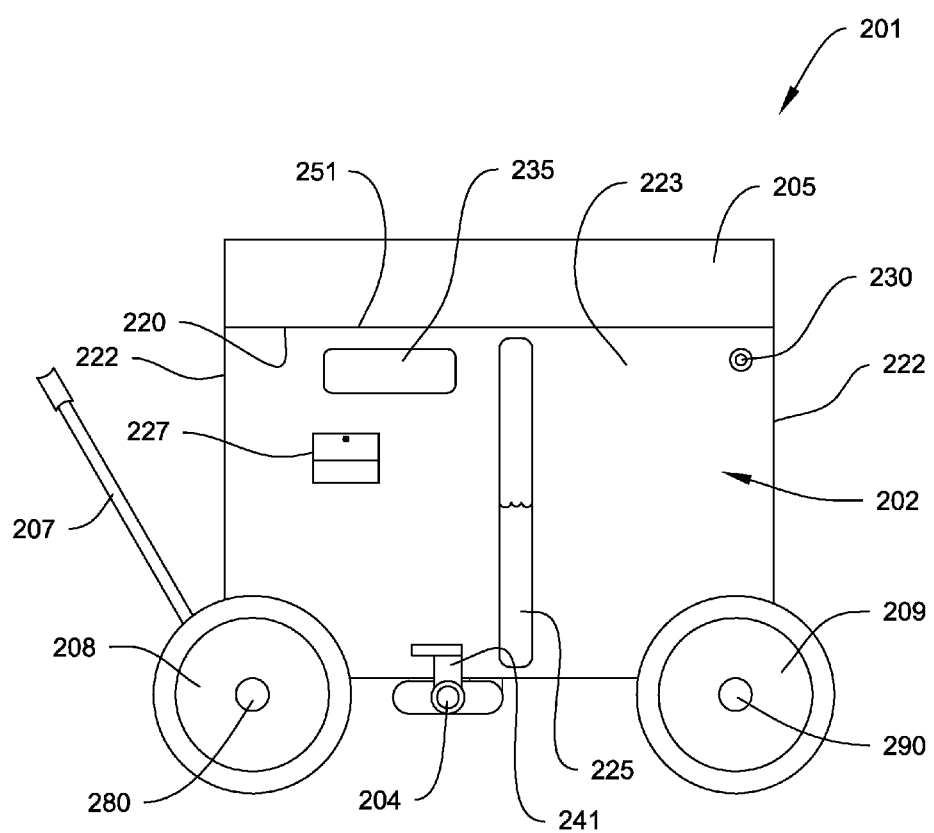
FIG. 2 is a side view illustrating an embodiment of a reservoir system for reusing unused water.

FIG. 2 illustrates a side perspective view of an embodiment of a reservoir system (201) for unused water. A reservoir body or tank (202), having a top side (220), a bottom side (221), lateral vertical sides (222) and longitudinal vertical sides (223), has a volumetric capacity to store the unused water. The reservoir tank (202) comprises a dump bucket (205), having a top surface (250) and a bottom surface (251), where the bottom surface (251) is secured to the top side (220) of the reservoir tank (202). Dump bucket (205) defines a bucket opening (256) that extends from top surface (250) to bottom surface (251).

Although reservoir tank (202) is illustrated as a box-like shape, other shapes such as cylinders or spheres may also be used and maintain the scope of the invention.

The top surface (250) of the dump bucket (205) is a water receiving area and preferably tapers downward from an outer edge of the top surface (250) towards the bucket opening to funnel the water towards the bucket opening and into the reservoir tank (202). The taper of top surface (250) may be pyramidal, conical, or any other shape that allows the liquid to funnel toward the bucket opening. The dump bucket (205) preferably has a similar perimeter to reservoir tank (202) as it allows for easier assembly and provides a wide water receiving area.

A pour valve (better shown in FIGS. 3A and 3B) is secured to the underside of the bottom surface (251). The pour valve is designed to open upon the weight of the water. The pour valve is advantageous in helping to deny any unwanted debris or bugs from entering the reservoir tank (202). The pour valve also keeps the water from escaping the reservoir tank (202) by way of splashing during transport, evaporation, or animals drinking the water. Dump bucket (205) and top side (220) of reservoir tank (202) may be removable to allow for cleaning of the reservoir tank (202).

A piping and water releasing mechanism of the reservoir system (201) comprises a release valve (204), a tank pipe (not shown), a spout pipe (not shown) and a switch (241). The release valve (204) is secured to the bottom side (221) of the reservoir tank (202). The tank pipe (not shown) is also secured to the bottom side (221) of the reservoir tank (202) and has one end attached to the release valve (204) and another end extending into the bottom side (221) of the reservoir tank (202). When the release valve is opened, water collected in reservoir tank (202) leaves the reservoir tank (202) via tank pipe (not shown) and then out through the release valve (not shown). By securing tank pipe (not shown) to the bottom side (221) of the reservoir tank (202), the reservoir system (201) utilizes gravity to pull the water out of the reservoir tank (202) and then through the tank pipe (242) to the release valve (204).

The spout pipe (not shown) may also be secured to the bottom side (221) of the reservoir tank (202). One end of spout pipe (not shown) is attached to the release valve (204) with the other end adapted to attach to a hose. The hose would be attached to a spout or spigot. Release valve (204) comprises the switch (241) that allows the user to toggle between using the water from the reservoir tank (202) and a spout. This is advantageous as the reservoir tank (202) may not contain enough water to perform the user's desired task.

Preferably reservoir tank (202) is a sealed tank that is air and water tight when all valves are closed. To assist the release of the stored liquid within the reservoir tank (202), the reservoir tank may be pressurized. This can be done with an air pump (represented by 235) integral to the reservoir system (201) or the reservoir system (201) can be adapted with an air intake/exhaust valve (represented by 230) to engage an external air pump. The pressurized tank (202) now provides the pressure and force to push the liquid out through the release valve when the release valve (204) is opened. When tank is pressurized, the pour valve is sealed tight against the bucket opening until the pressure is relieved.

Another example may have a reservoir with two chambers. The first chamber being a basic chamber wherein a liquid may be dumped or stored. The second chamber would act as a typical water pressure tank. Pressure tanks store pressurized water. The pressure tanks generally operate by using drops in pressure below a certain point to activate the pumps which replenish the water and raise the pressure. Most water systems are set up so the pump turns on at 20, 30 or 40 psi and turns off at 40, 50 or 60 psi, respectively.

The reservoir system (201) would have a motor or pump that when activated, pumps the liquid from the first chamber into the second chamber. The liquid would remain under pressure within the second chamber until the user opens the release valve (204), through which the pressurized liquid leaves the reservoir system (201). Preferably, the pump is user activated so that the pump is not activated with an empty first chamber as that may cause damage to pump and/or system.

If a pressurized reservoir tank is not desired by the user, the water may still be released from the reservoir tank (202) through the release valve (204) naturally by gravitational forces.

The reservoir system (201) further comprises a mobility mechanism, which includes front wheels (208), rear wheels (209), a front axle (280) and a rear axle (290), to provide mobility to the reservoir system (201). Front wheels (208) and rear wheels (209) are preferably secured to front axle (280) and rear axle (290), respectively, and front axle (280) and rear axle (290) secured to the bottom side (221) of reservoir tank (202). Front wheels (208) and rear wheels (209) may also be directly secured to the reservoir tank (202) by pegs, knobs or the like that extend out from the reservoir tank (202). Alternatively, the front axle (280) and/or rear axle (290) may be adapted to pivot to allow for improved steering of the reservoir system (201) while in transport.

A handle (207) may also be secured to the reservoir tank (202) to allow a user an easier way to pull the reservoir system (201) in transport to the desired location. Alternatively, handle (207) may be connected to the front axle (280) with pivoting capabilities to assist in pivoting the front axle (280) and steering the reservoir system (201) while in transit.

Preferably release valve (204) is located along the bottom of a longitudinal vertical side (223) with tank pipe (not shown) and spout pipe (not shown) extending laterally along the bottom side (221) of the reservoir tank (202). This arrangement keeps the release valve (204), tank pipe (not shown) and spout pipe (not shown) from interfering with the front axle (280) and rear axle (290). Release valve (204) may be located along a lateral vertical side (222) with tank pipe (not shown) and spout pipe (not shown) extending longitudinally along the bottom side (221) of the reservoir tank (202) if arranged to not interfere with the front axle (280) and/or rear axle (290).

Reservoir tank (202) may also have a water level indicator (225). Preferably, the water level indicator (225) is a clear portion of reservoir tank (202) where a user can clearly and easily see the water level. Other liquid level indicators like gauges, dials and the like may also be used.

Additionally, a hose hook (227) may be secured to the vertical wall (222) of the reservoir tank (202) to provide a convenient storage place for a hose apparatus.

Another advantage of the reservoir system described herein allows a user to have a large portable watering tank. A user may transport the reservoir system (201) to the desired watering location. This allows the user to have a large watering supply in any location. This alleviates multiple trips to refill a typical watering can or even having to carry a heavy watering can. It also provides a user who typically uses a watering hose to extend beyond their watering area because the user is not limited by the length of the watering hose.

All parts of the reservoir system may be made of plastic, metal or composite material or combination thereof. The material must strong enough to withstand any water pressure or water weight caused from the tank water or spout water. If metal is used, preferably a metal with rust resistance to withstand various weather climates. Any plastic or composite materials should have a crack resistance for a wide range of temperatures so as not to crack under typical climate conditions.

Figure 3A:
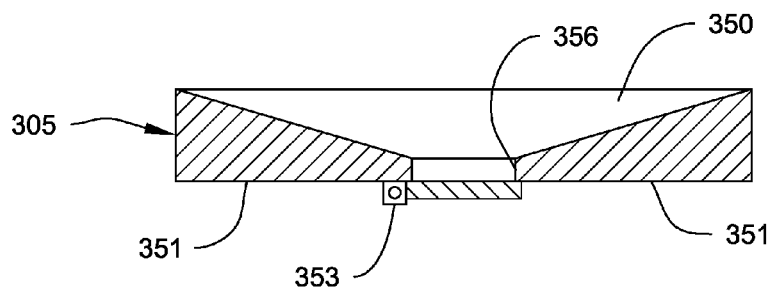
FIG. 3A is a cross-sectional view of an embodiment of a dump bucket for a reservoir system illustrating the pour valve in a closed position.
Figure 3B:
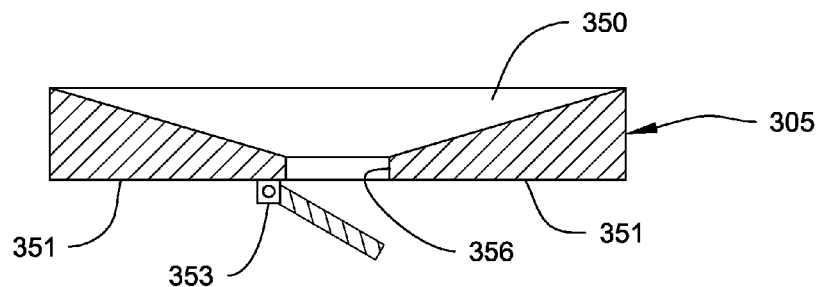
FIG. 3B is a cross-sectional view of an embodiment of a dump bucket for a reservoir system illustrating the pour valve in an open position.

FIG. 3A is a cross-sectional view of an embodiment of a dump bucket for a reservoir system illustrating the pour valve in a closed position. FIG. 3B is a cross-sectional view of an embodiment of a dump bucket for a reservoir system illustrating the pour valve in an open position.

The dump bucket (305), as shown in FIGS. 3A and 3B, has a top surface (350) and a bottom surface (351), where the bottom surface (351) is secured to the top side of a reservoir tank. Dump bucket (305) defines a bucket opening (356) that extends from top surface (350) to bottom surface (351).

The top surface (350) of the dump bucket (305) is a water receiving area and preferably tapers downward from an outer edge of the top surface (350) towards the bucket opening (356) to funnel the water towards the bucket opening (356) and into a reservoir tank. The taper of top surface (350) may be pyramidal, conical, or any other shape that allows the liquid to funnel toward the bucket opening (356). The dump bucket (305) preferably has a similar perimeter to the reservoir tank as it allows for easier assembly and provides a wide water receiving area.

A pour valve (353) is secured to the underside of the bottom surface (351) that at least encompasses the entire bucket opening (356). Pour valve (353) remains in a closed position as shown in FIG. 3A, but is designed to open upon the weight of the water as shown in FIG. 3B. The pour valve (353) is advantageous in helping to deny any unwanted debris or bugs from entering the reservoir tank. Pour valve (353), when in a closed position as shown in FIG. 3A, also keeps any water that may escape the reservoir tank by way of splashing during transport, evaporation, or animals drinking the water. The dump bucket (305) may be removable to allow for cleaning of the reservoir tank.

Preferably the reservoir tank is a sealed tank that is air and water tight when all valves are closed. To assist the release of the stored liquid within the reservoir tank, the reservoir tank may be pressurized. This can be done with an air pump integral to the reservoir system or the reservoir system can be adapted with an air intake/exhaust valve to engage an external air pump. The pressurized tank now provides the pressure and force to push the liquid out through the release valve when the release valve is opened. When tank is pressurized, pour valve (353) is sealed tight against bucket opening (356) until the pressure is relieved.

If a pressurized reservoir tank is not desired by the user, the water may still be released from the reservoir tank through the release valve naturally by gravitational forces.

Figure 4:
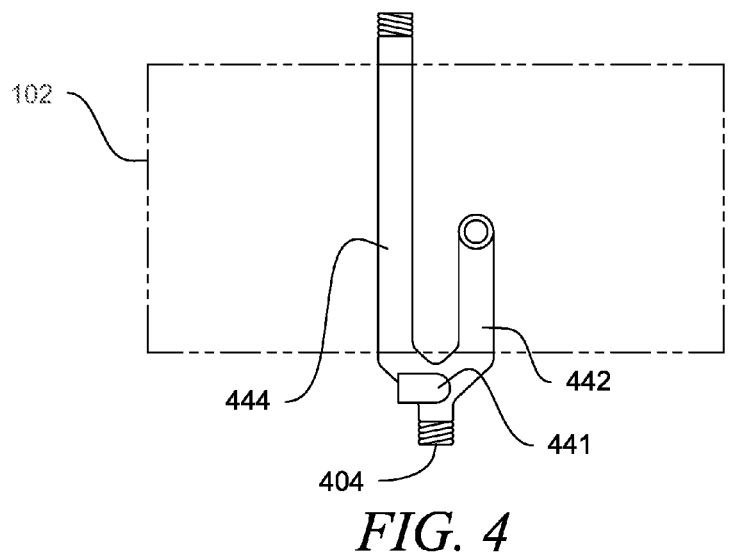
FIG. 4 is a top view of the piping and water releasing mechanism used in an embodiment of of a reservoir system for reusing unused water.

FIG. 4 is a top view of a piping and water releasing mechanism used in an embodiment of a reservoir system for reusing unused water.

The piping and water releasing mechanism of the reservoir system comprises a release valve (404), a tank pipe (442), a spout pipe (444) and a switch (441). The release valve (404) is secured to the bottom side of the reservoir tank. Tank pipe (442) has two ends, one end attached to the release valve (404) and the other end extending outward and then upward where it is adapted to secure to the bottom side of the reservoir tank. By securing tank pipe (442) to the bottom side of the reservoir tank, the reservoir system utilizes gravity to pull the water out of the reservoir tank and then through the tank pipe (442) to the release valve (404).

The spout pipe (444) is also two ends, with one end of spout pipe (144) attached to the release valve (404) and the other end adapted to attach to a hose. The hose would be attached to a spout or spigot. Release valve (404) comprises the switch (441) that allows the user to toggle between using the water from a reservoir tank and a spout. This is advantageous as the reservoir tank may not contain enough water to perform the user's desired task.

Preferably, the piping and water releasing mechanism extends laterally along the bottom side of the reservoir tank to keep the release valve (404), tank pipe (442) and spout pipe (444) from interfering with any wheel axles or other objects that may be present along the bottom side of the reservoir tank. The piping and water releasing mechanism may extend longitudinally along the bottom side of the reservoir tank if arranged so as not to interfere with any wheel axles or other objects that may be present along the bottom side of the reservoir tank.

All parts of the piping and water releasing mechanism of the reservoir system may be made of plastic, metal or composite material or combination thereof. The material must strong enough to withstand any water pressure caused from the tank water or spout water. If metal is used, preferably a metal with rust resistance to withstand various weather climates. Any plastic or composite materials should have a crack resistance for a wide range of temperatures so as not to crack under typical climate conditions.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Having described the invention, I claim:

1. A reservoir system, comprising:
   a tank having top side, a bottom side, lateral vertical sides, longitudinal vertical sides, an air valve and a volumetric capacity to store a liquid;
   a dump bucket, having a top surface and a bottom surface, where the bottom surface is secured to the top side of the tank, said dump bucket defining a bucket opening that extends from said top surface to said bottom surface of said dump bucket;
   a pour valve structure secured to the bottom surface of said dump bucket is associated with the entire bucket opening;
   a tank pipe having two ends with one end secured to a release valve and the other end extending into the bottom side of said tank, said release valve coupled to said tank pipe and secured to the bottom side of said tank, said tank pipe and release valve providing a release for fluid stored within the tank; a spout pipe and a switch, said spout pipe secured to the bottom side of said tank and having two ends with one end coupled to said release valve and the other end adapted to attach to a hose, said switch secured to the release valve allowing a user to toggle between the liquid from the tank pipe and liquid from the spout pipe; and
   a mobility mechanism having front wheels and rear wheels coupled to the bottom side of said tank.

2. The reservoir system of claim 1, wherein said top surface of said dump bucket tapers downward from an outer edge of said top surface down to said bucket opening to funnel any liquid on the top surface toward the bucket opening.

3. The reservoir system of claim 1, wherein said mobility mechanism also has a front axle and a rear axle, said front axle and rear axle secured to the bottom side of said tank, said axles positioned laterally extending from one longitudinal vertical side to the other longitudinal vertical side, said front wheels secured to the front axle and said rear wheels secured to the rear axle.

4. The reservoir system of claim 3, wherein said front axle is adapted to pivot.

5. The reservoir system of claim 1, wherein said reservoir system has a handle secured to the tank.

6. The reservoir system of claim 4, wherein said reservoir system has a handle secured to the pivotable front axle, said handle assisting with steering functions when said reservoir system is in transit.

7. The reservoir system of claim 1, wherein said tank pipe coupled with the release valve extends in a lateral direction along the bottom side of the tank.

8. The reservoir system of claim 1, wherein said tank has a liquid level indicator.

9. The reservoir system of claim 1, wherein said tank has a hose hook secured to said tank and adapted to receive a hose.

10. The system of claim 1, wherein said tank pipe coupled with the release valve extends in a lateral direction along the bottom side of the tank.

11. The system of claim 1, wherein said tank has a liquid level indicator.

12. A method of providing a reservoir system for storing and using unused liquid, comprising the steps of:
   providing a tank having top side, a bottom side, lateral vertical sides, longitudinal vertical sides, an air valve and a volumetric capacity to store a liquid;
   securing a dump bucket, having a top surface and a bottom surface, to the top side of the tank with the top side of said tank adjacent the bottom surface of said dump bucket, said dump bucket having a bucket opening that extends from said top surface to said bottom surface of said dump bucket;
   securing a pour valve structure to the bottom surface of said dump bucket, said pour valve structure associated with the entire bucket opening;
   providing a tank pipe having two ends and securing one end to a release valve and extending the other end into the bottom side of said tank,
   coupling said release valve to said tank pipe and securing said release valve to the bottom side of said tank, said tank pipe and release valve providing a release for fluid stored within the tank;

securing a spout pipe having two ends to the bottom side of said tank and attaching one end to said release valve and adapting the other end to attach to a hose;

securing a switch to the release valve allowing a user to toggle between the liquid from the tank pipe and liquid from the spout pipe; and coupling a mobility mechanism having front wheels and rear wheels to the bottom side of said tank.

13. The method of claim 12, wherein said top surface of said dump bucket tapers downward from an outer edge of said top surface down to said bucket opening to funnel any liquid on the top surface toward the bucket opening.

14. The method of claim 12, wherein said mobility mechanism also has a front axle and a rear axle, said front axle and rear axle secured to the bottom side of said tank, said front axle and rear axle positioned laterally extending from one longitudinal vertical side to the other longitudinal side, said front wheels secured to the front axle and said rear wheels secured to the rear axle.

15. The method of claim 14, wherein said front axle is adapted to pivot.

16. The method of claim 15, further comprising the step of securing a handle to the pivotable front axle, said handle assisting with steering functions when said reservoir system is in transit.

17. The method of claim 12, further comprising the step of securing a handle to the tank.

18. A reservoir system, comprising:
a tank having top side, a bottom side, lateral vertical sides, longitudinal vertical sides, an air valve and a volumetric capacity to store a liquid;
a dump bucket structure, having a top surface and a bottom surface, where the bottom surface is secured to the top side of the tank, said dump bucket defining a bucket opening that extends from said top surface to said bottom surface of said dump bucket, said top surface of said dump bucket tapers downward from an outer edge of said top surface down to said bucket opening to funnel any liquid on the top surface toward the bucket opening;
a pour valve structure secured to the bottom surface of said dump bucket is associated with the entire bucket opening;
a tank pipe having two ends with one end secured to a release valve and the other end extending into the bottom side of said tank, said release valve coupled to said tank pipe and secured to the bottom side of said tank, said tank pipe and release valve providing a release for fluid stored within the tank;
a spout pipe secured to the bottom side of said tank and having two ends with one end coupled to said release valve and the other end adapted to attach to a hose;
a switch secured to the release valve allowing a user to toggle between the liquid from the tank pipe and liquid from the spout pipe; and
a mobility mechanism having front wheels secured to a front axle and rear wheels secured to a rear axle, said front axle and rear axle secured to the bottom side of said tank, said front axle and rear axle positioned laterally extending from one longitudinal vertical side to the other longitudinal side.

19. The reservoir system of claim 18, wherein said front axle is adapted to pivot.

20. The reservoir system of claim 18, wherein said reservoir system has a handle secured to the tank.

21. The reservoir system of claim 19, wherein said reservoir system has a handle secured to the pivotable front axle, said handle assisting with steering functions when said reservoir system is in transit.

22. The reservoir system of claim 18, wherein said tank pipe and spout pipe coupled with the release valve extends in a lateral direction along the bottom side of the tank.

23. The reservoir system of claim 18, wherein said tank has a liquid level indicator.

24. The reservoir system of claim 18, wherein said tank has a hose hook secured to said tank and adapted to receive a hose.

* * * * *